(12) United States Patent
Elshafie et al.

(10) Patent No.: US 12,156,227 B2
(45) Date of Patent: Nov. 26, 2024

(54) TECHNIQUES FOR BUNDLING FEEDBACK MESSAGES IN WIRELESS COMMUNICATIONS

(71) Applicant: QUALCOMM Incorporated, San Diego, CA (US)

(72) Inventors: Ahmed Elshafie, San Diego, CA (US); Yi Huang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/481,061

(22) Filed: Sep. 21, 2021

(65) Prior Publication Data

US 2022/0095363 A1    Mar. 24, 2022

Related U.S. Application Data

(60) Provisional application No. 63/081,820, filed on Sep. 22, 2020.

(51) Int. Cl.
| | | |
|---|---|---|
| *H04W 72/23* | (2023.01) | |
| *H04L 1/1812* | (2023.01) | |
| *H04W 72/21* | (2023.01) | |

(52) U.S. Cl.
CPC .......... *H04W 72/23* (2023.01); *H04L 1/1812* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 9,402,247 B2* | 7/2016 | Bala | ................. | H04W 72/0413 370/329 |
| 9,992,009 B2* | 6/2018 | Wager | ................. | H04L 5/0091 370/329 |
| 10,355,897 B2* | 7/2019 | Liu | .................... | H04L 27/2602 375/260 |
| 2017/0257775 A1* | 9/2017 | Jiang | .................... | H04W 16/14 455/454 |
| 2018/0279295 A1* | 9/2018 | Gao | ..................... | H04W 72/21 370/329 |
| 2019/0045460 A1* | 2/2019 | Muruganathan | .... | H04W 52/367 455/522 |
| 2020/0260459 A1* | 8/2020 | Jiang | .................... | H04W 72/08 370/328 |

(Continued)

*Primary Examiner* — Gregory B Sefcheck
*Assistant Examiner* — Amit Johar
(74) *Attorney, Agent, or Firm* — Arent Fox, LLP

(57) ABSTRACT

Aspects described herein relate to receiving, from a base station, an uplink resource grant for transmitting uplink control information, where the uplink resource grant indicates an uplink control information format, bundling a number of instances of feedback in a number of feedback bits, where the number of feedback bits corresponds to the uplink control information format, and where the number of instances of feedback correspond to SPS downlink communications, and transmitting, to the base station and in the uplink control information, the number of feedback bits. Other aspects relate to transmitting the uplink resource grant, and receiving uplink control information based on the indicated uplink control information format.

29 Claims, 7 Drawing Sheets

(56) References Cited

U.S. PATENT DOCUMENTS

| | | | |
|---|---|---|---|
| 2021/0329683 A1* | 10/2021 | Yang | H04W 72/23 370/329 |
| 2022/0007399 A1* | 1/2022 | Rastegardoost | H04W 72/1273 370/329 |
| 2022/0183002 A1* | 6/2022 | Yeo | H04L 1/1607 370/329 |

* cited by examiner

TECHNIQUES FOR BUNDLING FEEDBACK MESSAGES IN WIRELESS COMMUNICATIONS

CLAIM OF PRIORITY UNDER 35 U.S.C. § 119

The present Application for patent claims priority to Provisional Patent Application No. 63/081,820, entitled "TECHNIQUES FOR BUNDLING FEEDBACK MESSAGES IN WIRELESS COMMUNICATIONS" filed Sep. 22, 2020, which is assigned to the assignee hereof and hereby expressly incorporated by reference herein for all purposes.

BACKGROUND

Aspects of the present disclosure relate generally to wireless communication systems, and more particularly, to bundling feedback for multiple received transmissions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can receive downlink transmissions from a base station and can report feedback for the downlink transmission including one or more bits. In some scenarios, the UE can report a single bit to indicate acknowledgement (ACK) or negative-ACK (NACK) of the downlink transmission. In other scenarios the UE can report one or more additional bits to indicate other types of feedback, such as discontinuous transmission (DTX).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to receive, from a base station, an uplink resource grant for transmitting uplink control information, wherein the uplink resource grant indicates an uplink control information format, bundle a number of instances of feedback in a number of feedback bits, wherein the number of feedback bits corresponds to the uplink control information format, and wherein the number of instances of feedback correspond to SPS downlink communications, and transmit, to the base station and in the uplink control information, the number of feedback bits.

According to another aspect, an apparatus for wireless communication is provided that includes a transceiver, a memory configured to store instructions, and one or more processors communicatively coupled with the memory and the transceiver. The one or more processors are configured to transmit, to a UE, one or more parameters for determining a number of instances of feedback for SPS downlink communications that are to be bundled in uplink control information for a given uplink control information format, transmit, to the UE, an uplink resource grant for uplink control information, wherein the uplink resource grant indicates the given uplink control information format, and receive, from the UE, the uplink control information over resources of the uplink resource grant.

In another aspect, a method for wireless communication is provided that includes receiving, from a base station, an uplink resource grant for transmitting uplink control information, wherein the uplink resource grant indicates an uplink control information format, bundling a number of instances of feedback in a number of feedback bits, wherein the number of feedback bits corresponds to the uplink control information format, and wherein the number of instances of feedback correspond to SPS downlink communications, and transmitting, to the base station and in the uplink control information, the number of feedback bits.

In another aspect, a method for wireless communication is provided that includes transmitting, to a UE, one or more parameters for determining a number of instances of feedback for SPS downlink communications that are to be bundled in uplink control information for a given uplink control information format, transmitting, to the UE, an uplink resource grant for uplink control information, wherein the uplink resource grant indicates the given uplink control information format, and receiving, from the UE, the uplink control information over resources of the uplink resource grant.

In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
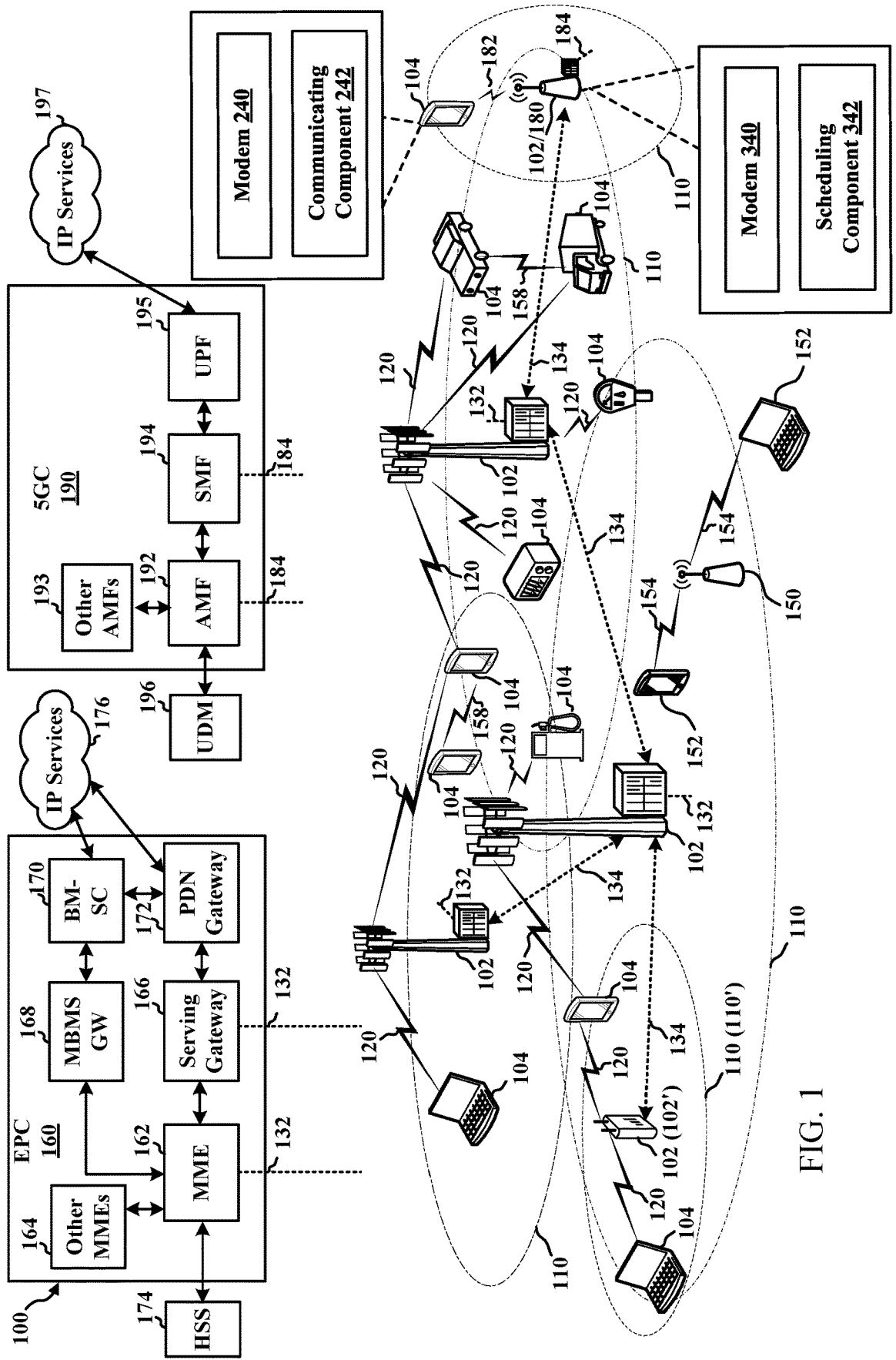
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to bundling feedback to be transmitted for multiple downlink transmissions. A user equipment (UE) can be configured to communicate with a base station based on a slot format that defines a communication direction assigned to slots or to multiple symbols that form the slot. A symbol may include an orthogonal frequency division multiplex (OFDM) symbol, a single carrier-frequency division multiplexing (SC-FDM) symbol, etc. For example, the slot format can indicate whether slots or symbols are for one of downlink communications, uplink communications, or may include a flexible symbol that can be dynamically configured as a downlink or uplink symbol. The UE can also be configured to receive semi-persistent scheduling (SPS) downlink transmissions from a base station over a period of time. Because the downlink transmissions are semi-persistently scheduled, and because symbol direction can vary based on the slot configuration, a feedback opportunity for transmitting feedback for a given downlink transmission may not be at a fixed location.

In fifth generation (5G) new radio (NR), for example, the UE can be configured with a downlink grant indicating the resources for SPS downlink transmissions. The downlink grant may also indicate a configured K1 value that indicates a number of slots or sub-slots, after the SPS downlink transmission, at which to transmit feedback corresponding to the SPS downlink transmission. Where the symbol or slot for feedback is indicated as downlink (e.g., in the slot format or in a grant for additional SPS downlink transmissions), the UE can delay the feedback until a next uplink symbol or slot (or sub-slot) for which an uplink resource grant is received from the base station. Specifically, for example, the UE can be configured to report hybrid automatic repeat/request (HARQ) feedback (e.g., acknowledgement (ACK), negative-ACK (NACK), discontinuous transmission (DTX), etc.) in K1 slots (or sub-slots); however, in case of SPS physical downlink shared channel (PDSCH), there is a possibility of collision between the physical uplink control channel (PUCCH) grant to transmit the HARQ feedback based on K1 and the downlink (DL) grants (or collisions with invalid slot/symbols/sub-slots as a result of mismatch between SPS periodicity and slot format/time division duplexing (TDD) pattern). In this case, the UE can defer the HARQ-ACK reporting to the next available uplink (UL) grants.

When there is a collision, in 5G NR, the UE can use a predefined multi-DL-SPS-AN configured resource(s) with certain PUCCH format, and can transmit feedback for all SPS configurations under same priority using one of those resources. In one example, among the received PDSCH signals, it can be assumed that the UE can report the HARQ-ACK of every K PDSCH signals during the next available PUCCH. If the total PDSCH signals is D, the UE can send D HARQ-ACK reports. One possibility is that, in a given feedback transmission (e.g., PUCCH), the UE can encode feedback for every L PDSCH signals (each PDSCH has a HARQ-ACK signal with 1 or 2 bits), hence, the number of feedback bits in this example is K=L or K=2 L bits. In this example, the HARQ-ACK bits for transmission can be stored in a first-in first-out (FIFO) queue, and the head K bits of the FIFO queue is sent in the earliest available UL slot. The UE can optionally encode the K bits into r bits to bundle or compress the K bits into r bits (e.g., where K is too large and UE uplink link budget is not enough). After bundling, or otherwise, the UE can perform channel coding with radio resource control (RRC)-configured parameter indicating a code rate for PUCCH. PUCCH, however, can be of one of multiple different formats (e.g., as indicated by the resource grant for PUCCH resources received from a base station) and not all formats support transmitting the same number of transmitted bits.

Accordingly, aspects described herein relate to determining a number of feedback instances to bundle (e.g., L above) based on an uplink control information format specified for uplink resources (e.g., specified for granted PUCCH resources). Based on the number of feedback instances, the UE can accordingly encode or bundle the number of feedback instances for transmitting in uplink control information based on the corresponding uplink control information format. In one example, the UE can determine the number of feedback instances to bundle based on a base number indicated for the uplink control information format, a number of symbols and/or the number of RBs in the granted uplink resources, etc. In an example, the base number and/or a maximum number of instances can be configured for the UE per uplink control information format. In addition, though slots are referred to herein, the described concepts can be similarly applied to sub-slots (e.g., portions of one slot or multiple slots). In this regard, for example, a UE can be enabled to transmit, over an uplink channel, multiple instances of feedback for received downlink transmissions while avoiding collision with downlink communications transmitted over a configured downlink channel. This can improve receipt of feedback for downlink transmissions, which can enhance communication reliability, conserve radio resources and processing received signals by decreasing a number of downlink retransmissions, etc.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for bundling feedback for multiple received transmissions, in accordance with aspects described herein. In addition, some nodes may have a modem 340 and scheduling component 342 for scheduling a device to bundle and transmit feedback for multiple received transmissions, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 of a base station 102 can configure a UE 104 to receive SPS downlink transmission from the base station 102. Scheduling component 342 can also configure the UE 104 to transmit feedback for the SPS downlink transmissions in uplink resources and based on an uplink control information (UCI) format. Communicating component 242 of a UE 104 can receive SPS downlink transmissions from a base station 102 and can determine to bundle feedback for the SPS downlink transmissions for transmitting in a next uplink transmission opportunity, as defined by the configured uplink resources. In an example, communicating component 242 can determine a number of feedback instances to bundle based on the UCI format indicated by the base station 102. For example, communicating component 242 can determine the number of feedback instances to bundle based on receiving one or more parameters for computing the number of feedback instances for a given one or multiple UCI formats indicated by the base station 102. Communicating component 242 can accordingly bundle feedback for the SPS downlink transmissions based on the number of instances to feedback and can transmit the bundled feedback to the base station 102. Scheduling component 342 can process the bundled feedback based on similarly determining the number of instances of feedback for the indicated UCI format.

Figure 2:
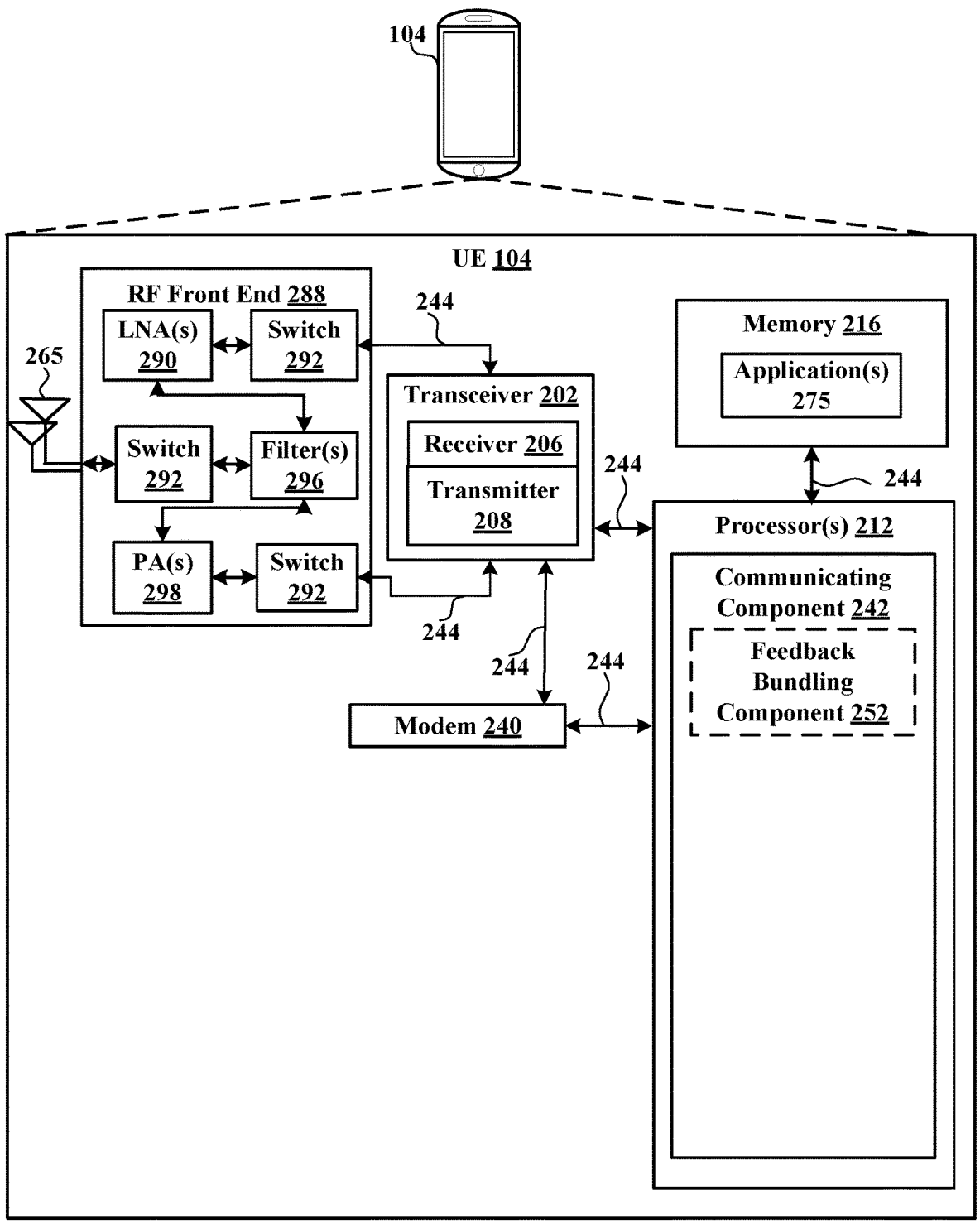
FIG. 2 is a block diagram illustrating an example of a UE, in accordance with various aspects of the present disclosure.
Figure 3:
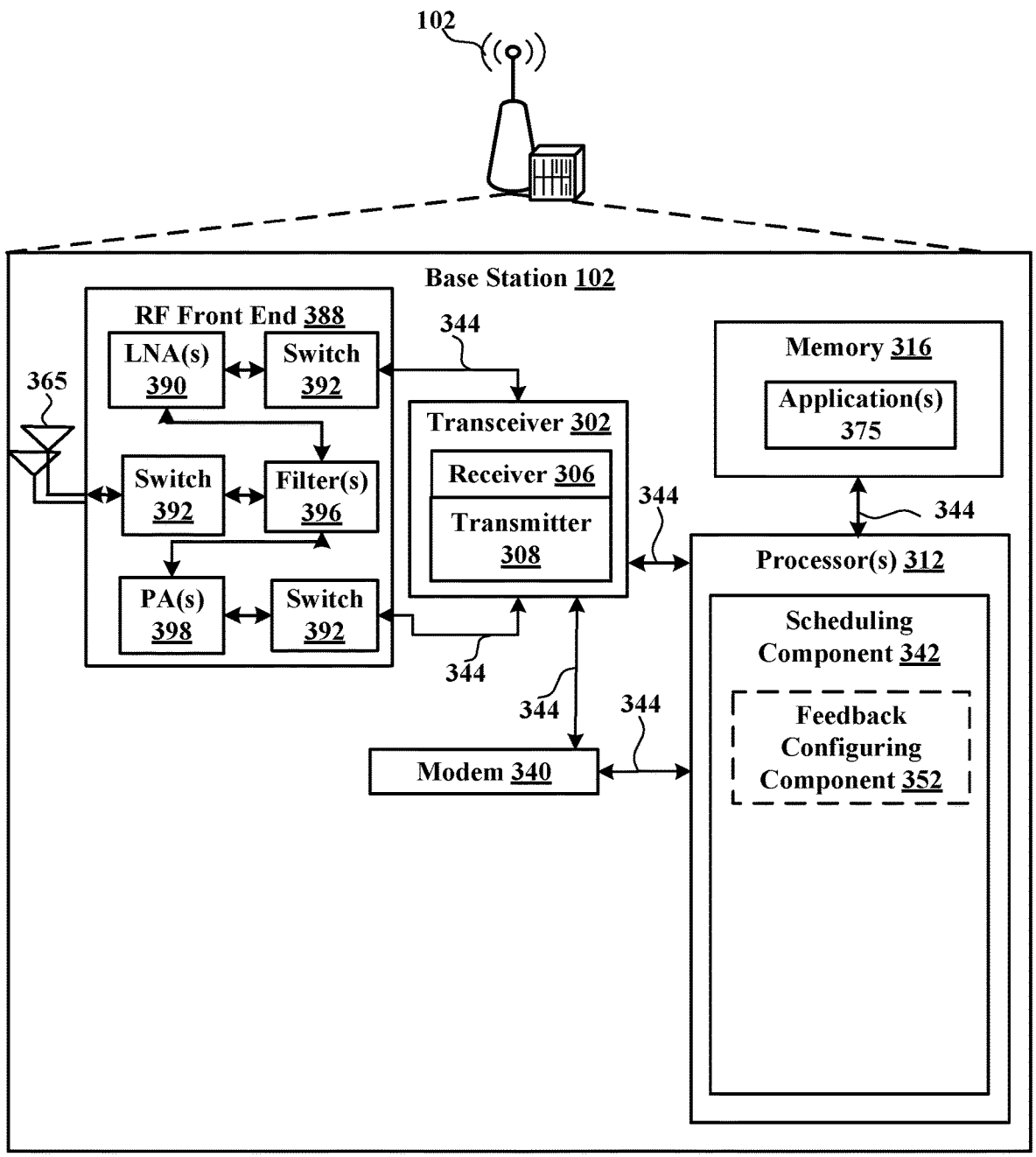
FIG. 3 is a block diagram illustrating an example of a base station, in accordance with various aspects of the present disclosure.
Figure 4:
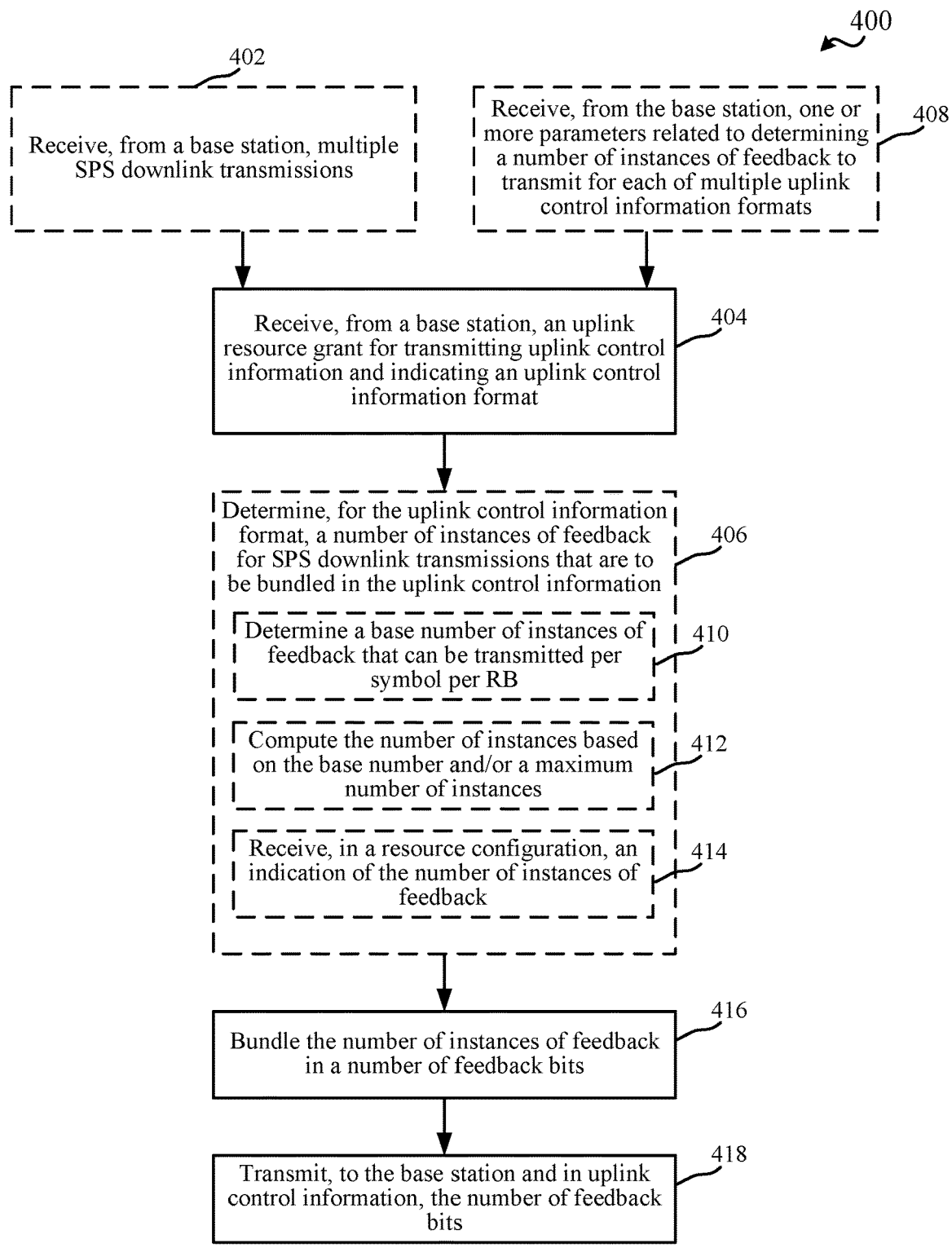
FIG. 4 is a flow chart illustrating an example of a method for bundling feedback for semi-persistent scheduling (SPS) downlink transmissions, in accordance with various aspects of the present disclosure.
Figure 5:
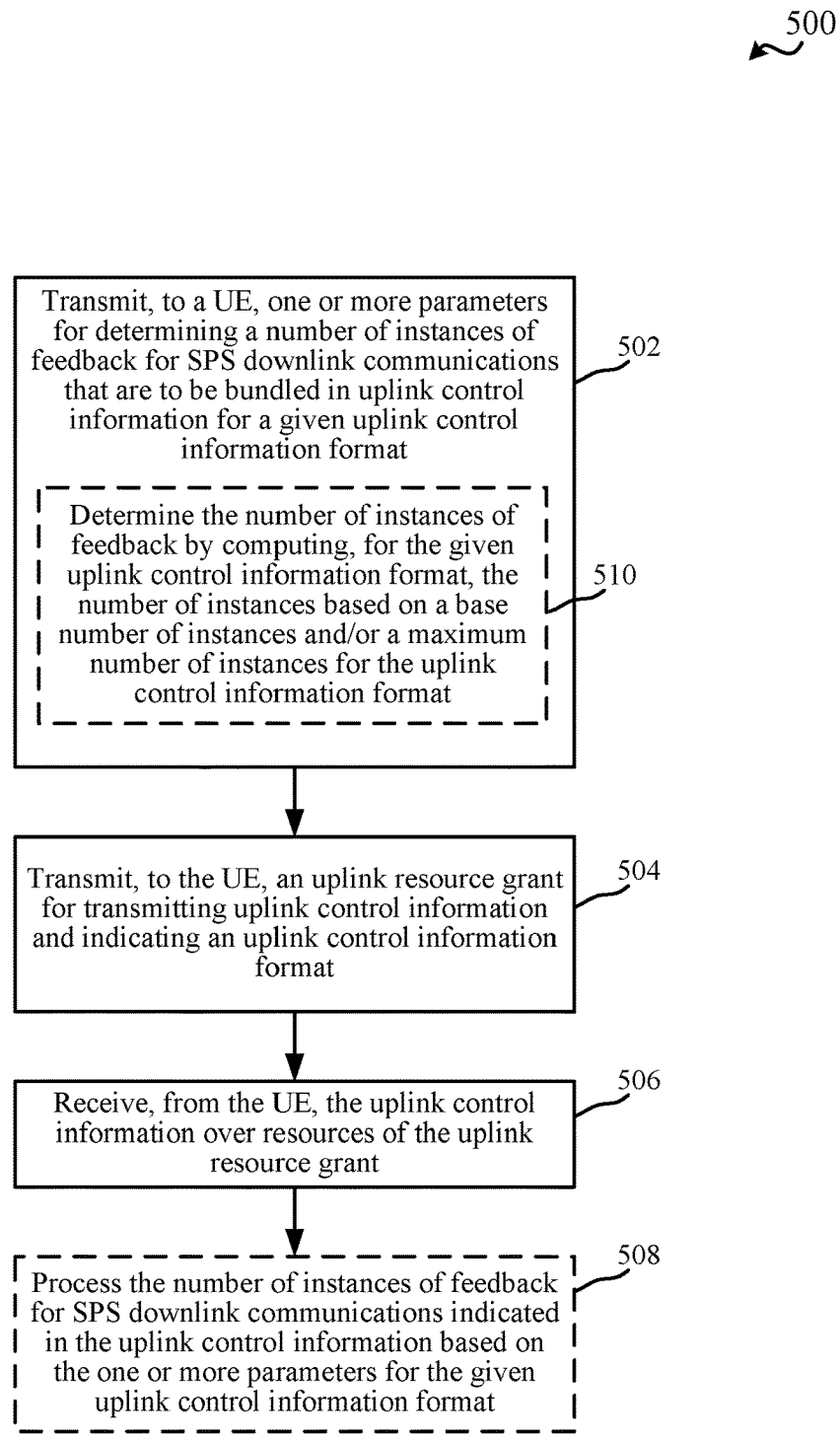
FIG. 5 is a flow chart illustrating an example of a method for configuring a device for bundling feedback for SPS downlink transmissions, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for bundling feedback for multiple received transmissions, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a feedback bundling component 252 for bundling feedback for multiple SPS downlink transmissions based on a number of feedback instances determined for a UCI format, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling a device to bundle and transmit feedback for multiple received transmissions, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a feedback configuring component 352 for configuring a device with one or more parameters for determining a number of feedback instances to bundle in transmitting feedback for SPS downlink transmissions based on a UCI format, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for bundling feedback for SPS downlink transmissions, in accordance with aspects described herein. In an example, a UE 104 can perform the functions described in method 400 using one or more of the components described in FIGS. 1 and 2.

In method 400, optionally at Block 402, multiple SPS downlink transmissions can be received from a base station. In an aspect, communicating component 242, e.g., in conjunction with processor(s) 212, memory 216, transceiver 202, etc., can receive, from the base station (e.g., base station 102), the multiple SPS downlink transmissions. For example, the base station 102 can configure the UE 104 to receive the multiple SPS downlink transmissions based on one or more SPS resource grants indicating resources for receiving downlink transmissions (e.g., PDSCH transmissions) from the base station. Communicating component 242 can accordingly receive the multiple SPS downlink transmissions over the associated downlink resources. An example is shown in FIG. 6

Figure 6:
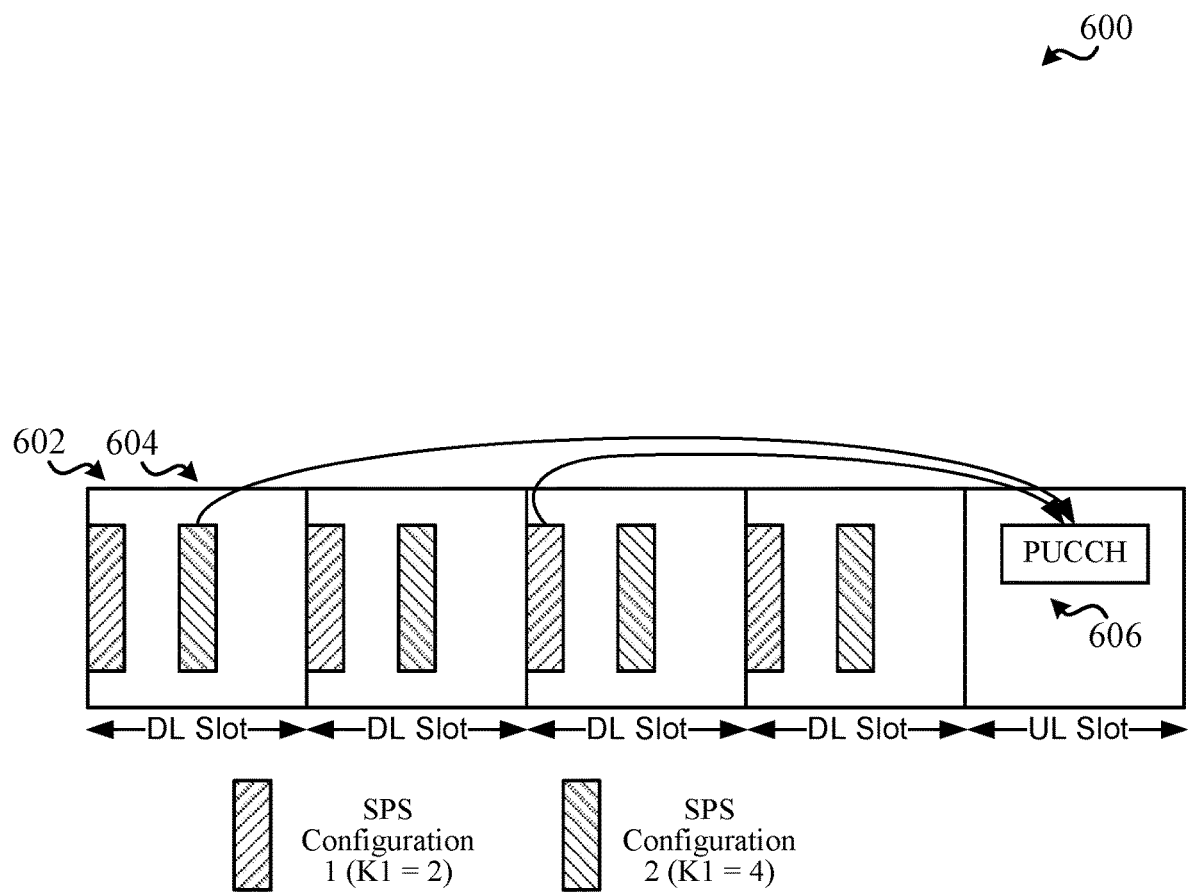
FIG. 6 illustrates an example of a timeline for SPS downlink transmissions, in accordance with various aspects of the present disclosure.

FIG. 6 illustrates an example of a timeline 600 for transmitting SPS downlink transmissions 602, 604 and feedback in PUCCH resources 606. The base station 102 can configure the UE 104 with SPS transmissions 602 based on SPS configuration 1, having K1=2, and can configure the UE 104 with SPS transmissions 604 based on SPS configuration 2, having K1=4. UE 104 can accordingly receive multiple SPS transmissions 602, 604 over multiple slots.

In method 400, at Block 404, an uplink resource grant for transmitting uplink control information and indicating a UCI format can be received from a base station. In an aspect, communicating component 242, e.g., in conjunction with processor(s) 212, memory 216, transceiver 202, etc., can receive, from the base station, the uplink resource grant for transmitting uplink control information and indicating the UCI format. For example, communicating component 242 can receive the uplink resource grant for transmitting PUCCH according to the UCI format, where the PUCCH can include feedback for the SPS downlink transmissions, as described. For example, communicating component 242 can receive the uplink resource grant in downlink control information (DCI) received from the base station 102 (e.g., over a physical downlink control channel (PDCCH), physical downlink shared channel (PDSCH)), etc.

In one example, communicating component 242 can receive the uplink resource grant, or a configuration or other information of the uplink resource grant, in DCI from the base station. In an example, the DCI may be based on an enhanced type 3 HARQ codebook, which may use DCI 1_1 or DCI 1_2 format. In another example, the uplink resource grant can correspond to a resource grant for uplink transmission following a collision of a scheduled uplink transmission with a downlink symbol based on a TDD pattern. In an example, the collision may result from a result of mismatch between SPS periodicity for uplink resources, which may be scheduled in an uplink resource grant, and slot format/TDD pattern, as described above. In addition, for example, the uplink resource grant may be a scheduled uplink resource grant (e.g., scheduled in DCI received from a base station), a next resource grant in a first available uplink symbol or slot (e.g., where the next resource grant can be a next resource grant based on SPS periodicity configured in a SPS grant that does not collide with a downlink symbol or slot in the slot format/TDD pattern), and/or the like.

For example, referring to FIG. 6, communicating component 242 can receive the uplink resource grant for PUCCH 606. Based on the uplink resources for the PUCCH not being within the K1 (e.g., based on the slot format or otherwise), however, UE 104 may not be able to comply at least with K1=2 of SPS configuration 1, such that the UE 104 may not be able to transmit feedback for some SPS transmissions 602 in configuration 1 within 2 slots. Thus, the UE 104 can defer the feedback until PUCCH resources 606, which may result in bundling of feedback for multiple SPS transmissions, as described further herein. This can result in accumulation of multiple feedback instances for multiple SPS transmissions 602, 604 in multiple slots for transmitting in the PUCCH 606.

In method 400, optionally at Block 406, a number of instances of feedback for SPS downlink transmissions that are to be bundled in the UCI can be determined for the UCI format. In an aspect, feedback bundling component 252, e.g., in conjunction with processor(s) 212, memory 216, transceiver 202, communicating component 242, etc., can determine, for the UCI format, the number of instances of feedback for SPS downlink transmissions that are to be bundled in the UCI. For example, different UCI formats can have different numbers of bits available for transmitting control information, and thus the UCI formats can have different capacity for transmitting feedback. An example of UCI formats can include the following where the description is based on 3GPP technical specification (TS) 38.300, section 5.3.3:

| Format Type | Length of Symbols | Number of Bits | Descriptions (based on TS 38.300) |
|---|---|---|---|
| Format 0 | 1-2 | <=2 | Short PUCCH with UE multiplexing in the same physical resource block (PRB). Based on sequence selection. |
| Format 1 | 4-14 | <=2 | Long PUCCH with UE multiplexing in the same PRB. Time-multiplex the UCI and demodulation reference signal (DMRS). |
| Format 2 | 1-2 | >2 | Short PUCCH with no multiplexing in the same PRB. Frequency-multiplex the UCI and DMRS. |
| Format 3 | 4-14 | >2 | Long PUCCH with large UCI payloads and with no multiplexing in the same PRB. Time-multiplex the UCI and DMRS. |
| Format 4 | 4-14 | >2 | Long PUCCH with moderate UCI payloads and with some multiplexing capacity (max 4 UEs) in the same PRB. |

In this example, each PUCCH format (also referred to herein as UCI format) can have a certain condition on the number of bits. For example, Format 0/1 can support 1 or 2 bits, so the number of feedback instances to be bundled (L) can be 1 (e.g., where the feedback is 2 bits to allow indication of ACK/NACK/DTX) or 2 (e.g., where the feedback is 1 bit to allow indication of ACK/NACK). Format 2/3/4 can support more than 2 bits and number of OFDM symbols can be 1 or 2 in Format 2, and 4 to 14 in Formats 3 and 4. For these formats, the number of feedback instances to be bundled (L) can be >=1 (can be any value greater than 1). Format 2 can have smaller values of L relative to Format 3/4 since Format 2 has 1 to 2 OFDM symbol possibility. In this regard, for example, feedback bundling component 252 can determine the number of feedback instances to be bundled based on the UCI format (e.g., such that different numbers of feedback instances can be determined for different UCI formats).

In method 400, optionally at Block 408, one or more parameters related to determining a number of instances of feedback to transmit for each of multiple UCI formats can be received from the base station. In an aspect, feedback bundling component 252, e.g., in conjunction with processor(s) 212, memory 216, transceiver 202, communicating component 242, etc., can receive, from the base station, the one or more parameters related to determining the number of instances of feedback to transmit for each of the multiple UCI formats. For example, the one or more parameters may include an indication of the number of instances of feedback to be included in a feedback report, parameters for computing the number of instances, such as a base number and/or a maximum number, etc., as described further herein. In an example, the base station 102 can transmit the one or more parameters, and feedback bundling component 252 can receive the one or more parameters, via RRC signaling, MAC-CE, DCI (e.g., in the PUCCH resource grant), etc. For example, the one or more parameters can be indicated for a given UCI format or per UCI format for multiple UCI formats For example, in determining the number of instances of feedback at Block 406, optionally at Block 410, a base number of instances of feedback that can be transmitted per symbol per RB can be determined. In an aspect, feedback bundling component 252, e.g., in conjunction with processor(s) 212, memory 216, transceiver 202, communicating component 242, etc., can determine the base number of instances of feedback that can be transmitted per symbol per RB. For example, the base number can be specified or configured for each given UCI format. In one example, the UE 104 may store a configuration indicating the base number for each given UCI format or may receive the configuration from the base station 102 (e.g., as described in Block 408).

In an example, in determining the number of instances of feedback at Block 406, optionally at Block 412, the number of instances can be computed based on the base number and/or a maximum number of instances. In an aspect, feedback bundling component 252, e.g., in conjunction with processor(s) 212, memory 216, transceiver 202, communicating component 242, etc., can compute the number of instances (L) based on the base number (also referred to herein as L0) and/or a maximum number of instances of feedback to be included in a feedback report (also referred to herein as Lmax). For example, feedback bundling component 252 can determine the number of instances (L) based on multiplying the base number (L0) by the number of symbols and/or the number of RBs corresponding to the PUCCH. As described, for example, the base number (L0) can be known by the UE 104 or received in a configuration from the base station 102 and/or can be specific for the UCI format. For example, feedback bundling component 252 can determine the number of symbols based on the UCI format (e.g., using the table above in one example) and/or the number of RBs based on the uplink resource grant.

In one specific example, at least for Formats 2, 3, 4, feedback bundling component 252 can determine the number of symbols L=min(L0*#OFDM symbols*#RBs, Lmax). Moreover, as described, L0 can be configured or specified per PUCCH format, meaning that Format 2/3/4 can have different L0. Formats 2, 3, and 4 may have different L0 from each other because they have different DMRS pattern, different waveform, different multi-user (MU) capability, etc. In addition, for example, L0 and/or Lmax can be signaled in RRC/MAC-CE per format or a DCI signal per format. In addition, in an example, feedback bundling component 252 can determine the number of OFDM symbols and/or the number of RBs in a PUCCH resource configuration. For example, as described in further detail below, base station 102 can transmit a PUCCH resource configuration (e.g., in RRC signaling) indicating multiple possible PUCCH resource configurations that can be activated by the base station 102 for the UE 104. Each PUCCH resource configuration can indicate a number of OFDM symbols for the PUCCH resource configuration, a starting RB and/or maximum number of RBs for the PUCCH resource configuration, a UCI format for the PUCCH resource configuration, etc. In this example, feedback bundling component 252 can determine the number of OFDM symbols, number of RBs and/or UCI format based on the PUCCH resource configuration activated by the base station 102 for the PUCCH resource grant.

In another example, in determining the number of instances of feedback at Block 406, optionally at Block 414, an indication of the number of instances of feedback can be received in a resource configuration. In an aspect, feedback bundling component 252, e.g., in conjunction with processor(s) 212, memory 216, transceiver 202, communicating component 242, etc., can receive, in the resource configuration, the indication of the number of instances of feedback. For example, the base station 102 can configure the PUCCH resources (e.g., in RRC signaling) to indicate, for each PUCCH resource, a certain format, number of OFDM symbols, starting RB, maximum number of RBs, etc., as described. In addition, in an example, the base station 102 can configure the base number of instances (L0) and/or maximum number of instances (Lmax) in the PUCCH resource configuration as well, and feedback bundling component 252, in an example, can determine the L0 and/or Lmax from the PUCCH resource configuration, and can accordingly compute the number of instances (L) to bundle for transmission.

In method 400, at Block 416, the number of instances of feedback can be bundled in a number of feedback bits. In an aspect, feedback bundling component 252, e.g., in conjunction with processor(s) 212, memory 216, transceiver 202, communicating component 242, etc., can bundle the number of instances of feedback in the number of feedback bits. In an example, the number of feedback bits can correspond to the uplink control information format (e.g., as indicated by the base station in UCI), and/or the number of instances of feedback can correspond to the received number of SPS downlink communications, or at least the number of SPS downlink communications for which feedback is to be reported. For example, as described above, feedback bundling component 252, based on the determined number of instances of feedback (L), can generate K feedback bits, where K=L grants multiplied by the number of bits per grant (e.g., 1 bit where ACK/NACK is to be transmitted or 2 bits when ACK/NACK/DTX is to be transmitted). For example, feedback bundling component 252 can obtain the first K bits from the FIFO queue storing the instances of feedback, optionally encode the K bits into r bits by compressing the K bits into the r bits if the K is too large and the uplink budget is not enough, and/or perform channel coding based on the configured code rate.

In method 400, at Block 418, the number of feedback bits can be transmitted to the base station in uplink control information. In an aspect, communicating component 242, e.g., in conjunction with processor(s) 212, memory 216, transceiver 202, etc., can transmit, to the base station and in uplink control information, the number of feedback bits. Communicating component 242 can transmit the number of feedback bits as channel coded for the PUCCH over resources indicated in the PUCCH resource grant. As described in further detail herein, a node receiving the feedback (e.g., a base station or another UE in sidelink communications) can process the bundled feedback to determine which transmissions may be retransmitted to the UE 104.

FIG. 5 illustrates a flow chart of an example of a method 500 for configuring a device to bundle feedback for SPS downlink transmissions, in accordance with aspects described herein. In an example, a base station 102 can perform the functions described in method 500 using one or more of the components described in FIGS. 1 and 3.

In method 500, at Block 502, one or more parameters for determining a number of instances of feedback for SPS downlink communications that are to be bundled in UCI for a given UCI format can be transmitted to a UE. In an aspect, feedback configuring component 352, e.g., in conjunction with processor(s) 312, memory 316, transceiver 302, scheduling component 342, etc., can transmit, to the UE (e.g., UE 104), one or more parameters for determining the number of instances of feedback for SPS downlink communications that are to be bundled in UCI for the given UCI format. In an example, feedback configuring component 352 can transmit, to the UE, the one or more parameters including parameters for determining the number of instances of feedback for multiple UCI formats, as described above. In this example, the UE 104 can determine the number of instances based on the UCI format indicated by the base station 102. Moreover, for example, the one or more parameters may include an indication of the number of instances of feedback (L) for one or more UCI formats, a base number of instances (L0) for one or more UCI formats, a maximum number of instances (Lmax) for one or more UCI formats, etc. Feedback configuring component 352 can transmit the one or more parameters to the UE 104 in at least one of RRC signaling, MAC-CE, DCI, etc., as described.

In method 500, at Block 504, an uplink resource grant for transmitting UCI and indicating a UCI format can be transmitted to a UE. In an aspect, scheduling component 342, e.g., in conjunction with processor(s) 312, memory 316, transceiver 302, etc., can transmit, to the UE (e.g., UE 104), an uplink resource grant for transmitting UCI and indicating the UCI format. For example, scheduling component 342 can transmit the uplink resource grant indicating resources for PUCCH transmission and indicating a UCI format (e.g., Format 0, 1, 2, 3, or 4 described above). Based on the UCI format and the one or more parameters, as described, the UE 104 can determine a number of instances of feedback to bundle in transmitting feedback for SPS transmissions over the PUCCH resources.

In method 500, at Block 506, the UCI can be received, from the UE, over resources of the uplink resource grant. In an aspect, scheduling component 342, e.g., in conjunction with processor(s) 312, memory 316, transceiver 302, etc., can receive, from the UE (e.g., UE 104), the uplink control information over the resources of the uplink resource grant. For example, scheduling component 342 can receive the UCI including bundled feedback over PUCCH resources, as indicated.

In method 500, optionally at Block 508, the number of instances of feedback for SPS downlink communications indicated in the UCI can be processed based on the one or more parameters for the given UCI format. In an aspect, scheduling component 342, e.g., in conjunction with processor(s) 312, memory 316, transceiver 302, etc., can process the number of instances of feedback for SPS downlink communications indicated in the UCI based on the one or more parameters for the given UCI format. For example, scheduling component 342 can unbundle the feedback instances based on the one or more parameters indicated to the UE 104 and the UCI format to determine which feedback relates to which SPS transmissions. Scheduling component 342 can accordingly determine the feedback for SPS transmissions and can determine whether to retransmit SPS transmissions based on the feedback, or take other action based on whether ACK or NACK (or DTX) is received. In an example, scheduling component 342 can decode the UCI to obtain the feedback bits, and can determine how the feedback bits correspond to the instances of feedback based on determining the L value for the UCI format, the number of symbols and/or RBs of the UCI, etc., as described above.

In an example, in transmitting the one or more parameters to the UE at Block 502, optionally at Block 510, the number of instances of feedback can be determined by computing, for the given UCI format, the number of instances based on a base number of instances and/or a maximum number of instances for the UCI format. In an aspect, feedback configuring component 352, e.g., in conjunction with processor(s) 312, memory 316, transceiver 302, scheduling component 342, etc., can determine the number of instances of feedback by computing, for the given UCI format, the number of instances based on a base number of instances and/or a maximum number of instances for the UCI format. As described, the base number and/or maximum number can be fixed or configured for a given UCI format. Feedback configuring component 352, in this example, can compute the number of instances L based on the base number and/or maximum number (e.g., according to a formula, such as $L=\min(L0 * \#OFDM\ symbols * \#RBs, Lmax)$). In an example, feedback configuring component 352 can indicate the number of instances (L) to the UE 104 to use in bundling feedback for transmitting over PUCCH resources, as described. In one example, feedback configuring component 352 can signal the number of instances as part of the PUCCH resource configuration (e.g., in RRC signaling, as described above).

Figure 7:
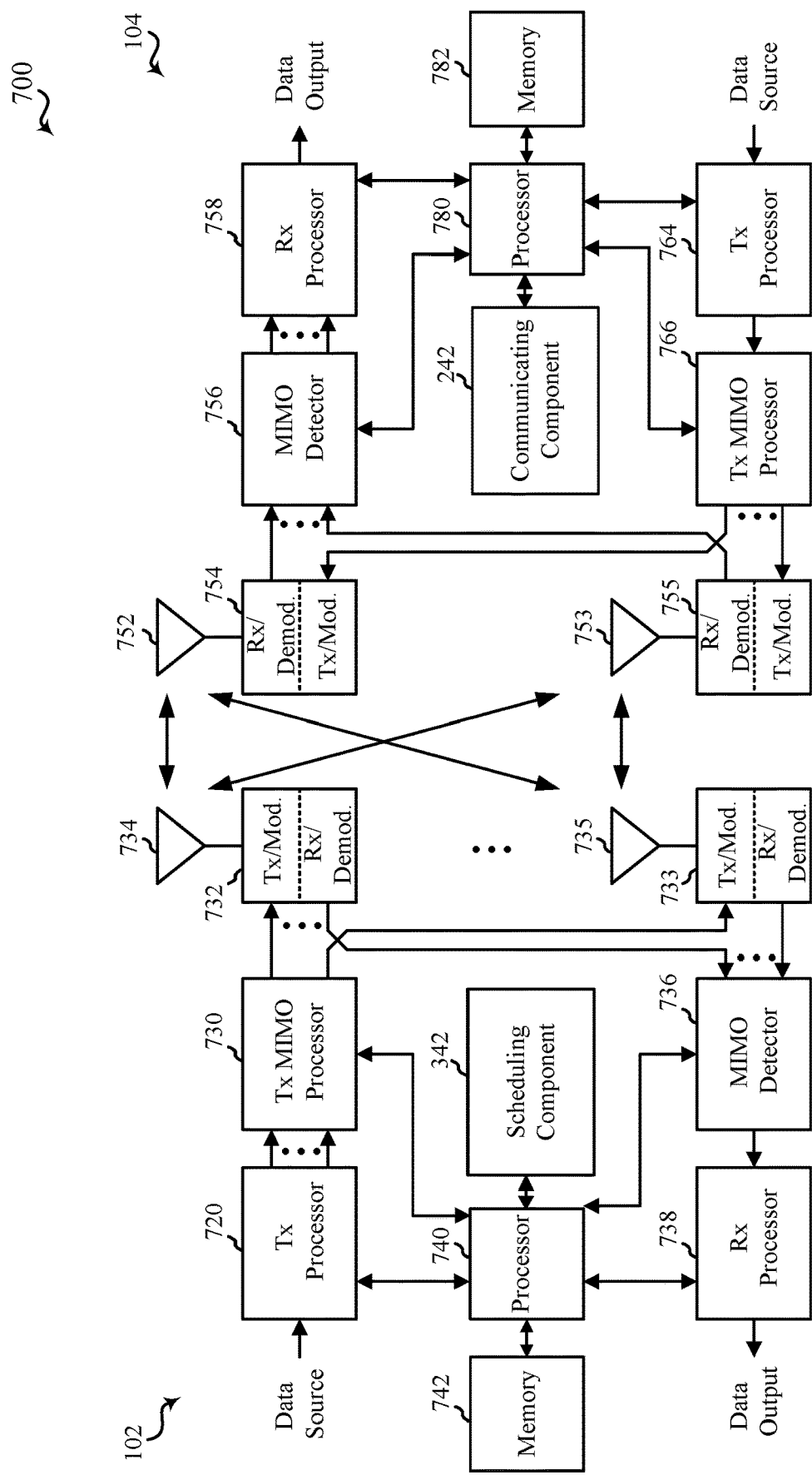
FIG. 7 is a block diagram illustrating an example of a multiple-input multiple-output (MIMO) communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including receiving, from a base station, an uplink resource grant for transmitting uplink control information, where the uplink resource grant indicates an uplink control information format, determining, for the uplink control information format, a number of instances of feedback for SPS downlink communications that are to be bundled in the uplink control information, bundling the number of instances of feedback in a number of feedback bits, and transmitting, to the base station and in the uplink control information, the number of feedback bits.

In Aspect 2, the method of Aspect 1 includes where determining the number of instances of feedback includes determining a base number of instances of feedback that can be transmitted per symbol per resource block in the uplink control information.

In Aspect 3, the method of Aspect 2 includes receiving, from the base station, an indication of the base number of instances of feedback for each of multiple uplink control information formats that includes the uplink control information format.

In Aspect 4, the method of Aspect 3 includes where receiving the indication of the base number of instances of feedback for each of multiple uplink control information formats includes receiving, from the base station, the indication in at least one of RRC signaling per uplink control information format, or a MAC-CE per uplink control information format.

In Aspect 5, the method of any of Aspects 3 or 4 includes where the number of instances of feedback is different for each of the multiple uplink control information formats.

In Aspect 6, the method of any of Aspects 2 to 5 includes where determining the number of instances of feedback further includes, based on the uplink control information format, computing the number of instances as a minimum of a maximum number of instances and the base number multiplied by both a number of symbols and a number of resource blocks associated with the uplink control information format.

In Aspect 7, the method of any of Aspects 1 to 6 includes where determining the number of instances of feedback includes receiving, in a resource configuration for one or more uplink control information formats including the uplink control information format, an indication of the number of instances of feedback.

Aspect 8 is a method for wireless communication including transmitting, to a UE, one or more parameters for determining a number of instances of feedback for SPS downlink communications that are to be bundled in uplink control information for a given uplink control information format, transmitting, to the UE, an uplink resource grant for uplink control information, where the uplink resource grant indicates the given uplink control information format, receiving, from the UE, the uplink control information over resources of the uplink resource grant, and processing the number of instances of feedback for SPS downlink communications indicated in the uplink control information based on the one or more parameters for the given uplink control information format.

In Aspect 9, the method of Aspect 8 includes where the one or more parameters indicate a base number of instances of feedback that can be transmitted per symbol per resource block in the given uplink control information.

In Aspect 10, the method of Aspect 9 includes where the one or more parameters include an indication of the base number of instances of feedback for each of multiple uplink control information formats that includes the given uplink control information format.

In Aspect 11, the method of Aspect 10 includes where transmitting the one or more parameters includes transmitting, to the UE, the one or more parameters in at least one of RRC signaling per uplink control information format, or a MAC-CE.

In Aspect 12, the method of any of Aspects 10 or 11 includes where the number of instances of feedback is different for each of the multiple uplink control information formats.

In Aspect 13, the method of any of Aspects 8 to 12 includes where the one or more parameters include an indication of the number of instances of feedback.

In Aspect 14, the method of Aspect 13 includes determining the number of instances of feedback by computing, for the given uplink control information format, the number of instances as a minimum of a maximum number of instances and the base number multiplied by both a number of symbols and a number of resource blocks associated with the uplink control information format.

Aspect 15 is a method for wireless communication including receiving, from a base station, an uplink resource grant for transmitting uplink control information, where the uplink resource grant indicates an uplink control information format, bundling a number of instances of feedback in a number of feedback bits, where the number of feedback bits corresponds to the uplink control information format, and where the number of instances of feedback correspond to SPS downlink communications, and transmitting, to the base station and in the uplink control information, the number of feedback bits.

In Aspect 16, the method of Aspect 15 includes where a configuration of the uplink resource grant corresponds to downlink control information received from the base station that indicates a type 3 HARQ codebook.

In Aspect 17, the method of any of Aspects 15 or 16 includes where the uplink resource grant corresponds to a resource grant for uplink transmission following a collision of a scheduled uplink transmission with a downlink symbol based on a TDD pattern.

In Aspect 18, the method of Aspect 17 includes where the uplink resource grant is one of a scheduled uplink resource grant or a next resource grant in a first available uplink slot.

In Aspect 19, the method of any of Aspects 15 to 18 includes where the number of instances of feedback corresponds to a base number of instances of feedback that can be transmitted per symbol per resource block in the uplink control information.

In Aspect 20, the method of Aspect 19 includes receiving, from the base station, an indication of the base number of instances of feedback for each of multiple uplink control information formats that includes the uplink control information format.

In Aspect 21, the method of Aspect 20 includes where receiving the indication of the base number of instances of feedback for each of multiple uplink control information formats includes receiving, from the base station, the indication in at least one of RRC signaling per uplink control information format, or a MAC-CE per uplink control information format In Aspect 22, the method of any of Aspects 20 or 21 includes where the number of instances of feedback is different for each of the multiple uplink control information formats.

In Aspect 23, the method of any of Aspects 19 to 22 includes where the number of instances of feedback corresponds to a minimum of a maximum number of instances, and the base number multiplied by both a number of symbols and a number of resource blocks associated with the uplink control information format.

In Aspect 24, the method of any of Aspects 15 to 23 includes receiving, in a resource configuration for one or more uplink control information formats including the uplink control information format, an indication of the number of instances of feedback.

Aspect 25 is a method for wireless communication including transmitting, to a UE, one or more parameters for determining a number of instances of feedback for SPS downlink communications that are to be bundled in uplink control information for a given uplink control information format, transmitting, to the UE, an uplink resource grant for uplink control information, where the uplink resource grant indicates the given uplink control information format, and receiving, from the UE, the uplink control information over resources of the uplink resource grant.

In Aspect 26, the method of Aspect 25 includes where a configuration of the uplink resource grant corresponds to downlink control information transmitted to the UE that indicates a type 3 HARQ codebook.

In Aspect 27, the method of any of Aspects 25 or 26 includes where the uplink resource grant corresponds to a resource grant for uplink transmission following a collision of a scheduled uplink transmission with a downlink symbol based on a TDD pattern.

In Aspect 28, the method of Aspect 27 includes where the uplink resource grant is one of a scheduled uplink resource grant or a next resource grant in a first available uplink slot.

In Aspect 29, the method of any of Aspects 25 to 28 includes processing the number of instances of feedback for SPS downlink communications indicated in the uplink control information based on the one or more parameters for the given uplink control information format.

In Aspect 30, the method of any of Aspects 25 to 29 include where the one or more parameters indicate a base number of instances of feedback that can be transmitted per symbol per resource block in the given uplink control information.

In Aspect 31, the method of Aspect 30 includes where the one or more parameters include an indication of the base number of instances of feedback for each of multiple uplink control information formats that includes the given uplink control information format.

In Aspect 32, the method of Aspect 31 includes where transmitting the one or more parameters includes transmitting, to the UE, the one or more parameters in at least one of RRC signaling per uplink control information format, or a MAC-CE.

In Aspect 33, the method of any of Aspects 31 or 32 includes where the number of instances of feedback is different for each of the multiple uplink control information formats.

In Aspect 34, the method of any of Aspects 30 to 33 includes where the number of instances of feedback corresponds to, for the given uplink control information format, a minimum of a maximum number of instances, and the base number multiplied by both a number of symbols and a number of resource blocks associated with the uplink control information format.

In Aspect 35, the method of any of Aspects 25 to 34 includes where the one or more parameters include an indication of the number of instances of feedback.

Aspect 36 is an apparatus for wireless communication including a transceiver, a memory configured to store instructions, and one or more processors communicatively coupled with the memory and the transceiver, where the one or more processors are configured to perform one or more of the methods of any of Aspects 1 to 35.

Aspect 37 is an apparatus for wireless communication including means for performing one or more of the methods of any of Aspects 1 to 35.

Aspect 38 is a computer-readable medium including code executable by one or more processors for wireless communications, the code including code for performing one or more of the methods of any of Aspects 1 to 35.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
receive, from a base station, an uplink resource grant for transmittinguplink control information, wherein the uplink resource grant indicates an uplink control information format;
bundle a number of instances of feedback for semi-persistent scheduled (SPS) downlink communications in a number of feedback bits, wherein the number of instances of feedback correspond to a minimum of:
a maximum number of instances of feedback; and
a base number of instances of feedback that can be transmitted per symbol per resource block in the uplink control information multiplied by both a number of symbols and a number of resource blocks associated with the uplink control information format, wherein the base number of instances corresponds to the uplink control information format; and
transmit, to the base station and in the uplink control information, the number of feedback bits.

2. The apparatus of claim 1, wherein a configuration of the uplink resource grant corresponds to downlink control information received from the base station that indicates a type 3 hybrid automatic repeat/request (HARQ) codebook.

3. The apparatus of claim 1, wherein the uplink resource grant corresponds to a resource grantfor uplink transmissionfollowinga collision of a scheduled uplink transmission with a downlink symbol based on a time division duplexing (TDD) pattern.

4. The apparatus of claim 3, wherein the uplink resource grant is one of a scheduled uplink resource grant or a next resource grant in a first available uplink slot.

5. The apparatus of claim 1, wherein the one or more processors are further configured to receive, from the basestation, an indication of the base number of instances of feedback for each of multiple uplink control information formats that includes the uplink control information format.

6. The apparatus of claim 5, wherein the one or more processors are configured to receive the indication of the base number of instances of feedback for each of multiple uplink control information formats including receiving, from the base station, the indication in at least one of radio resource control (RRC) signaling per uplink control information format, or a media access control-control element (MAC-CE) per uplink control information format.

7. The apparatus of claim 5, wherein the number of instances of feedback is different for each of the multiple uplink control information formats.

8. The apparatus of claim 1, wherein the one or more processors are further configured to receive, in a resource configuration for one or more uplink control information formats including the uplink control information format, an indication of the number of instances of feedback.

9. An apparatus for wireless communication, comprising:
a transceiver;
a memory configured to store instructions; and
one or more processors communicatively coupled with the memory and the transceiver, wherein the one or more processors are configured to:
transmit, to a user equipment (UE), one or more parameters for determining a number of instances of feedback for semi-persistent scheduled (SPS) downlink communications that are to be bundled in uplink control information for a given uplink control information format;
transmit, to the UE, an uplink resource grant for uplink control information, wherein the uplink resource grant indicates the given uplink control information format; and
receive, from the UE, the uplink control information over resources of the uplink resource grant, wherein the uplink control information includes the number of instances of feedback bundled for semi-persistent scheduled (SPS) downlink communications in a number of feedback bits, wherein the number of instances of feedback correspond to a minimum of:
a maximum number of instances of feedback; and
a base number of instances of feedback that can be transmitted per symbol per resource block in the uplink control information multiplied by both a number of symbols and a number of resource blocks associated with the uplink control information format, wherein the base number of instances corresponds to the uplink control information format.

10. The apparatus of claim 9, wherein a configuration of the uplink resource grant corresponds to downlink control information transmitted to the UE that indicates a type 3 hybrid automatic repeat/request (HARQ) codebook.

11. The apparatus of claim 9, wherein the uplink resource grant corresponds to a resource grant for uplink transmission following a collision of a scheduled uplink transmission with a downlink symbol based on a time division duplexing (TDD) pattern.

12. The apparatus of claim 11, wherein the uplink resource grant is one of a scheduled uplink resource grant or a next resource grant in a first available uplink slot.

13. The apparatus of claim 9, wherein the one or more processors are further configured to process the number of instances of feedback for SPS downlink communications indicated in the uplink control information based on the one or more parameters for the given uplink control information format.

14. The apparatus of claim 9, wherein the one or more parameters include an indication of the base number of instances of feedback for each of multiple uplink control information formats that includes the given uplink control information format.

15. The apparatus of claim 14, wherein the one or more processors are configured to transmit the one or more parameters including transmitting, to the UE, the one or more parameters in at least one of radio resource control (RRC) signaling per uplink control information format, or a media access control-control element (MAC-CE).

16. The apparatus of claim 14, wherein the number of instances of feedback is different for each of the multiple uplink control information formats.

17. The apparatus of claim 9, wherein the one or more parameters include an indication of the number of instances of feedback.

18. A method for wireless communication, comprising:
receiving, from a base station, an uplink resource grant for transmitting uplink control information, wherein the uplink resource grant indicates an uplink control information format;
bundling a number of instances of feedback for semi-persistent scheduled (SPS) downlink communications in a number of feedback bits, wherein the number of instances of feedback correspond to a minimum of:
a maximum number of instances of feedback; and
a base number of instances of feedback that can be transmitted per symbol per resource block in the uplink control information multiplied by both a number of symbols and a number of resource blocks associated with the uplink control information format, wherein the base number of instances corresponds to the uplink control information format; and
transmitting, to the base station and in the uplink control information, the number of feedback bits.

19. The method of claim 18, wherein a configuration of the uplink resource grant corresponds to downlink control information received from the base station that indicates a type 3 hybrid automatic repeat/request (HARQ) codebook.

20. The method of claim 18, wherein the uplink resource grant corresponds to a resource grant for uplink transmission following a collision of a scheduled uplink transmission with a downlink symbol based on a time division duplexing (TDD) pattern, and wherein the uplink resource grant is one of a scheduled uplink resource grant or a next resource grant in a first available uplink slot.

21. The method of claim 20, wherein the uplink resource grant is one of a scheduled uplink resource grant or a next resource grant in a first available uplink slot.

22. The method of claim 18, further comprising receiving from the base station, an indication of the base number of instances of feedback for each of multiple uplink control information formats that includes the uplink control information format.

23. The method of claim 22, wherein receiving the indication of the base number of instances of feedback for each of multiple uplink control information formats includes receiving, from the base station, the indication in at least one of radio resource control (RRC) signaling per uplink control information format, or a media access control-control element (MAC-CE) per uplink control information format.

24. The method of claim 22, wherein the number of instances of feedback is different for each of the multiple uplink control information formats.

25. The method of claim 18, further comprising receiving, in a resource configuration for one or more uplink control information formats including the uplink control information format, an indication of the number of instances of feedback.

26. A method for wireless communication, comprising:
transmitting, to a user equipment (UE), one or more parameters for determining a number of instances of feedback for semi-persistent scheduled (SPS) downlink communications that are to be bundled in uplink control information for a given uplink control information format;
transmitting, to the UE, an uplink resource grant for uplink control information, wherein the uplink resource grant indicates the given uplink control information format; and receiving, from the UE, the uplink control information over resources of the uplink resource grant, wherein the uplink control information includes the number of instances of feedback bundled for semi-persistent scheduled (SPS) downlink communications in a number of feedback bits, wherein the number of instances of feedback correspond to a minimum of:
  a maximum number of instances of feedback; and
  a base number of instances of feedback that can be transmitted per symbol per resource block in the uplink control information multiplied by both a number of symbols and a number of resource blocks associated with the uplink control information format, wherein the base number of instancescorresponds to the uplink control information format.

27. The method of claim 26, wherein a configuration of the uplink resource grant corresponds to downlink control information transmitted to the UE that indicates a type 3 hybrid automatic repeat/request (HARQ) codebook.

28. The method of claim 26, wherein the uplink resource grant corresponds to a resource grant for uplink transmission following a collision of a scheduled uplink transmission with a downlink symbol based on a time division duplexing (TDD) pattern.

29. The method of claim 26, further comprising processing the number of instances of feedback for SPS downlink communications indicated in the uplink control information based on the one or more parameters for the given uplink control information format.

* * * * *